(12) United States Patent
Peyghambarian et al.

(10) Patent No.: US 7,973,989 B2
(45) Date of Patent: Jul. 5, 2011

(54) SYSTEM AND METHOD USING A VOLTAGE KICK-OFF TO RECORD A HOLOGRAM ON A PHOTOREFRACTIVE POLYMER FOR 3D HOLOGRAPHIC DISPLAY AND OTHER APPLICATIONS

(75) Inventors: Nasser N. Peyghambarian, Tucson, AZ (US); Robert A. Norwood, Tucson, AZ (US); Pierre-Alexandre Jean Blanche, Tucson, AZ (US); Savas Tay, Stanford, CA (US)

(73) Assignee: The Arizona Board of Regents on Behalf of the University of Arizona, Tucson, AZ (US)

( * ) Notice: Subject to any disclaimer, the term of this patent is extended or adjusted under 35 U.S.C. 154(b) by 600 days.

(21) Appl. No.: 12/185,087

(22) Filed: Aug. 2, 2008

(65) Prior Publication Data
US 2009/0046333 A1    Feb. 19, 2009

Related U.S. Application Data

(60) Provisional application No. 60/964,619, filed on Aug. 14, 2007.

(51) Int. Cl.
*G03H 1/18* (2006.01)
*G03H 1/02* (2006.01)
(52) U.S. Cl. .............. 359/7; 359/3; 359/4; 359/35
(58) Field of Classification Search .......... 359/3, 4, 359/5, 6, 7, 35; 365/124, 125
See application file for complete search history.

(56) References Cited

U.S. PATENT DOCUMENTS

| | | | | | |
|---|---|---|---|---|---|
| 4,807,970 | A | * | 2/1989 | Dube et al. | 359/7 |
| 5,684,612 | A | * | 11/1997 | Wilde et al. | 359/7 |
| 5,822,090 | A | * | 10/1998 | Wilde | 359/7 |
| 6,859,293 | B2 | * | 2/2005 | Klug et al. | 359/4 |

OTHER PUBLICATIONS

Oksana Ostroverkhova et al, Organic Photorefractives: Mechanisms, Materials, and Applications, Chem Rev. 104, 3267-3314, Jun. 26, 2004.
M. Eralp et al, Submillisecond response of a photorefractive polymer under single nanosecond pulse exposure, Applied Physics Letters 89, 114105, Sep. 13, 2006.

* cited by examiner

*Primary Examiner* — Audrey Y Chang
(74) *Attorney, Agent, or Firm* — Eric A. Gifford

(57) ABSTRACT

An updateable system and method of recording a hologram on a media simultaneously reduces the writing time and increases persistence without sacrificing diffraction efficiency. A voltage kick-off technique controls the bias electric field applied to a photorefractive polymer media in conjunction with the application of the writing beams and dark decay. Essentially the voltage kick-off technique applies a high electric field above the optimal field while the writing beams are on and reduces the electric field when the writing beams are off during dark decay. The voltage kick-off technique produced two separate unexpected results. First, when the writing beams are turned off and the electric field is lowered the diffraction efficiency continues to increase until it reaches a maximum efficiency that is within a few percent of that achieved by writing at the optimal field until steady-state is achieved. Second, the decay time constant is much larger than expected producing a much longer persistence without sacrificing diffraction efficiency or writing time.

27 Claims, 15 Drawing Sheets

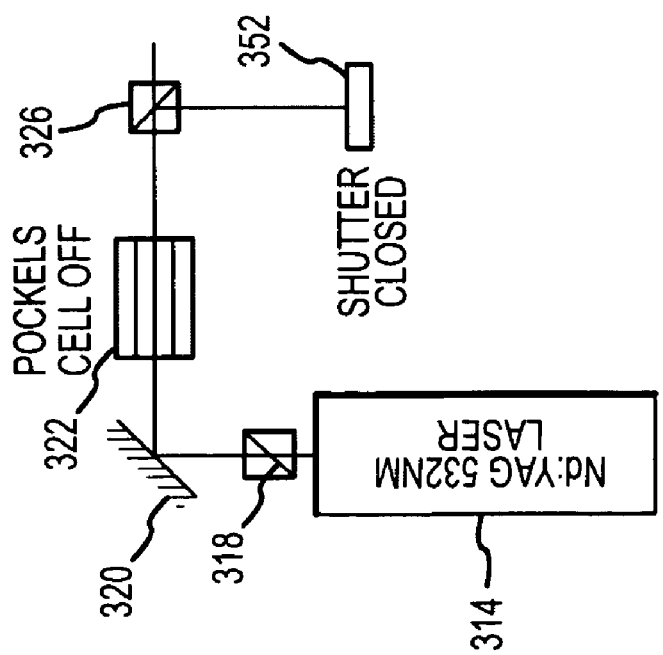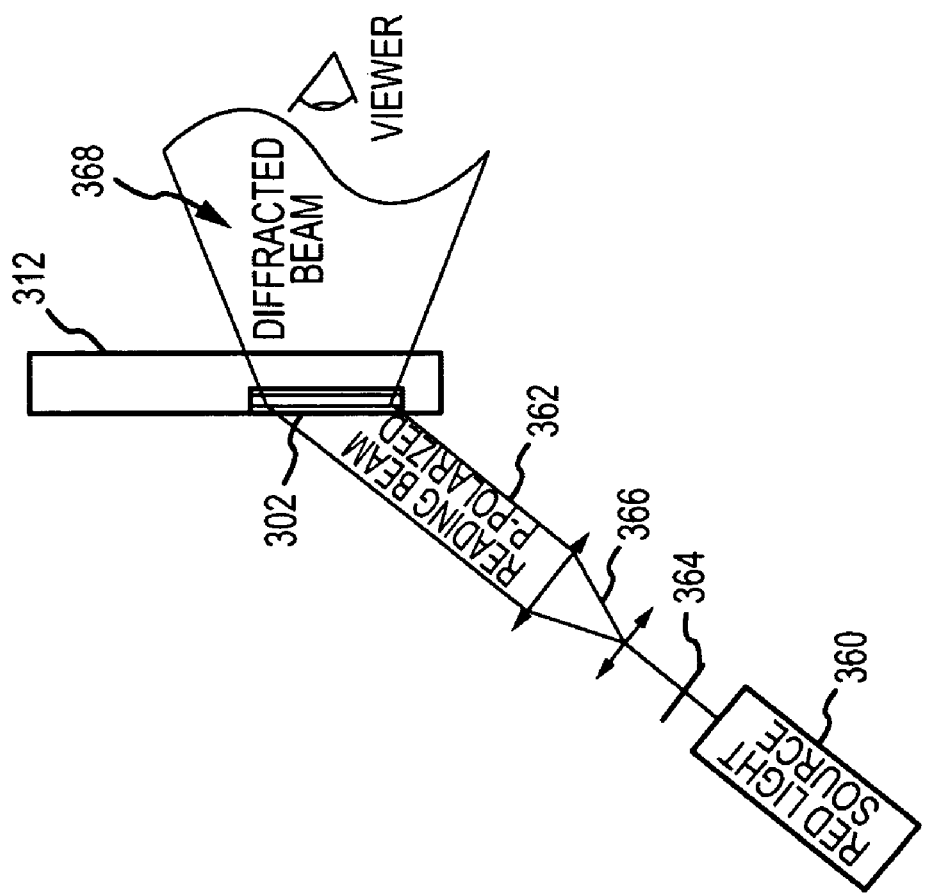
FIG. 17

SYSTEM AND METHOD USING A VOLTAGE KICK-OFF TO RECORD A HOLOGRAM ON A PHOTOREFRACTIVE POLYMER FOR 3D HOLOGRAPHIC DISPLAY AND OTHER APPLICATIONS

CROSS-REFERENCE TO RELATED APPLICATIONS

This application claims benefit of priority under 35 U.S.C. 119(e) to U.S. Provisional Application No. 60/964,619 entitled "Updateable 3D Holographic Display Employing Photorefractive Polymers With Unprecedented Properties And Voltage Kick-Off Technique For Enhancing Writing Speed And Lengthening The Persistence Time" and filed on Aug. 14, 2007, the entire contents of which are incorporated by reference.

GOVERNMENT LICENSE RIGHTS

This invention was made with government support under grant number FA9550-07-1-0071 awarded by U.S. Air Force Office of Scientific Research. The government has certain rights in the invention.

BACKGROUND OF THE INVENTION

1. Field of the Invention

This invention relates to recording holograms and, more particularly, to a method of recording updateable holograms on a photorefractive polymer with a short write time at high diffraction efficiency and long persistence for 3D Holographic Displays and other applications.

2. Description of the Related Art

Holography is a technique that allows the light scattered from an object to be recorded and later reconstructed so that it appears as if the object is in the same position relative to the recording medium as it was when recorded. Alternately, holograms can be computer generated by calculating the modulation pattern that would have been formed if beams with certain characteristics (wave front, intensity) would have crossed each other. The calculated pattern is next transferred to a medium to make the actual hologram. The image changes as the position and orientation of the viewing system change in exactly the same way is if the object were still present, thus making the recorded image (hologram) appear three dimensional. The technique of holography can also be used to optically store, retrieve, and process information. While holography is commonly used to display static 3-D pictures, it is not yet possible to generate arbitrary scenes by a holographic volumetric display.

As shown in FIG. 1, when two coherent optical beams e.g. a reference beam 10 and an object beam 12 of finite beam width cross each other at a point in space, they interfere. The phase difference between the beams at each spatial location in the plane defined by the bisector of the vectors formed by the two beams defines the intensity pattern. The recording of this intensity variation into a medium 14 as a phase and/or intensity modulation results in the formation of a hologram 16. The object beam may be scattered from the object or modulated based on computer generated images to produce a 3D image. Typical media include film, photothermoplastics, photopolymers, photochoromics and photorefractive (PR) polymers.

PR polymers are dynamic holographic recording materials. As shown in FIG. 2, a recording device 20 includes a layer of PR polymer material 22 sandwiched between a ground electrode 24 on electrode support 26 and a high-voltage electrode 28 on electrode support 30. A high-voltage power supply 32 applies a voltage between ground electrode 24 and high-voltage electrode 28 to provide a bias electric field 34 across the PR polymer.

As shown in FIG. 3, in PR polymers, a three-dimensional refractive index pattern—a phase hologram 40—replicates the non-uniform interference pattern 42 formed by the two incident coherent light fields 44 and 46. This effect is based on the build-up of an internal space-charge field $E_s$ 48 due to selective transport and trapping of the photo-generated charges 50, and an electric field induced index change via the electro-optic effect. This process—in contrast to photochemical processes involved in photopolymer holograms—is fully reversible, as trapped charges can be de-trapped by uniform illumination. The erasability of the PR gratings allows for refreshing/updating of the holograms. In a typical PR material the holograms are viewed with the help of a reading beam, as long as the initial writing (recording) beams are present. When the writing beams are turned off, the PR hologram decays at a rate determined by the material properties and ambient temperature. PR polymers that have fast recording usually have high decay rates.

The quality of the PR polymer and the written hologram can be evaluated with respect to three parameters: write time, diffraction efficiency and persistence. The write time is simply how long the writing beams must illuminate the media to record the hologram. The diffraction efficiency determines the intensity or contrast (quality) of the recorded hologram. In theory, PR polymers can achieve 100% diffraction efficiency. The persistence is a measure of the rate of decay of the hologram and is defined herein to be the time from when the write beams are removed until the diffraction efficiency falls to 10%.

As shown in FIG. 4, in PR polymer materials used in transmission holograms, the diffraction efficiency 60 according to the applied bias electric field is a periodic function. Indeed, the diffraction efficiency $\eta$ is related to the index modulation $\Delta n$ by the following equation: $\eta \propto \sin^2(\Delta n_{(E)})$, the index modulation being proportional to the applied field: $\Delta n \propto (E_{ext})^P$, with usually 1>P>2. While the index modulation monotonically increases with the external field, the efficiency periodically goes through maxima and minima. The diffraction efficiency as a function of the bias field is measured under steady state conditions, meaning that the field is varied slowly enough as to not perturb the efficiency by any dynamic effect. So, the efficiency is time stable at each point and the value equals the plateau observed in the dynamic measurement. The first maximum 62 of the diffraction efficiency defines the optimum field. It is the minimum field for which the efficiency is at a maximum. At lower fields the efficiency is less than at the optimum. This defines the "low field region" 64. Increasing the field above the optimum decreases the efficiency to a second minimum 66 before it increases again to a second maximum 68 and so on. This defines the "high field region" 70. Depending on the application, PR polymer materials are operated near the optimum field for best efficiency or at the highest possible field for largest two beam coupling gain. Operating a PR polymer at high field endangers the material due to the risk of dielectric breakdown and one must use caution in that domain to avoid damaging the material. Moreover, high applied fields reduce the efficiency and generate parasitic effects like second order diffraction (the reason that the second maximum is usually smaller than the first one).

FIG. 5 shows the diffraction efficiency as a function of time measured at various constant electric fields. $T_0$ is the time when writing beams are turned on. The electric field is turned on prior to $T_0$ so there is no dynamic effect related to bias field build up. $T_d$ is the time when both writing beams are turned off. The dark decay is the self erasure of the hologram measured at constant field. Both writing and decay dynamics depend on the applied bias field. For a low field, the efficiency 80 ramps up slowly to reach a plateau (steady-state) equal to the diffraction efficiency for the low field in FIG. 4 when the writing beams are on. Once the writing beams are turned off, the efficiency 80 decays with a large time constant. Dark decay occurs because of thermally activated recombination of charges, leading to erasure of the internal space-charge field which ultimately reduces the index modulation and thus the diffraction efficiency. The lower the field the less steep the initial decay of the dark decay curve. For the optimal field, the efficiency 82 ramps up more quickly to reach a plateau (steady-state) equal to the diffraction efficiency for the optimal field in FIG. 4 when the writing beams are on. Once the writing beams are turned off, the efficiency 82 decays with a moderate time constant. Although the time constant for decay is smaller than for the low field because the plateau diffraction efficiency is much higher, the persistence for the optimal field is actually larger. For a high field, the initial rise of the efficiency 84 is faster than for the optimum field case but the final efficiency is less. Moreover, if the field is set above the second efficiency minimum 66 defined in FIG. 4, the time dependent diffraction efficiency reaches a first peak 86, reduces to a minimum 88 and then increases again before reaching the steady state. Although the initial time constant for the high field case is smaller than that for the optimal field, the writing time to achieve steady-state diffraction is comparable. Once the writing beams are turned off, the efficiency 84 decays with a small time constant. For all of the fields, a figure of merit (FOM) defined as the ratio of the persistence (decay time to 10% efficiency) to the write time is between 1 and 10 depending upon the polymer material. These results lead one to conclude that the optimum field value is the best setting for writing time, efficiency and persistence.

Holographic 3D displays are one application of recordable holograms. Computer generated holographic 3D displays provide highly realistic images without the need for special eyewear, making them valuable tools for applications that require "situational awareness" such as medical, industrial, and military imaging. Current commercially available holographic 3D displays employ photopolymers that lack image-updating capability, resulting in their restricted use and high cost. Dynamic updateable 3D holographic displays based on acousto-optic, liquid crystal display and MEMS based recording media have been demonstrated. Unfortunately, these devices do not have memory, and thus do not exhibit persistence of recorded images. The lack of persistence results in the requirement of update rates faster than 30 Hz to avoid image flicker. Since 3D images exhibit very high information content, this high refresh rate requirement currently limits real time holographic displays to small sizes. Although updateable, PR polymers have not been used for 3D displays because of their large writing times and low persistence. The ultimate goal is to be able to write at high enough rates to provide near video capability. An interim goal is provide the capability to update holograms with reasonable write times, high diffraction efficiency and persistence long enough to view the display. To extend dynamic holographic 3D displays towards practical applications, alternative materials with high efficiency, reversible recording capabilities, memory, and significantly larger sizes are needed.

U.S. Pat. No. 6,859,293 to Klug et al. entitled "Active Digital Hologram Display" issued Feb. 22, 2005 discloses that certain types of holographic recording materials can be used to updateably record holographic stereograms. Klug discloses different writing configurations and does mention that pulsed lasers may shorten the write time considerably. However, this patent does not discuss techniques for achieving updateable holograms with exceptionally large persistence, and more particularly large FOM.

SUMMARY OF THE INVENTION

The present invention provides an updateable system and method of recording a hologram in a photorefractive polymer that simultaneously reduces the writing time and increases persistence without sacrificing diffraction efficiency. This technique is well-suited for use with an updateable 3D computer generated holographic display.

This is accomplished with a voltage "kick-off" technique for controlling the bias electric field applied to a photorefractive polymer in coordination with the application of the writing beams and dark decay. Essentially the voltage kick-off technique applies a high electric field above the optimal field while the writing beams are on and reduces the electric field when the writing beams are off during dark decay. The high field is suitably as high as possible without risking dielectric breakdown of the material. A value between the mean of the optimal field and $2^{nd}$ minimum and a conservative estimate of the breakdown voltage is typical. The writing beams are turned on for a relatively short period of time, a fraction of the time required for the optimal field to reach steady-state. The writing beams may be provided by a continuous wave (CW) laser that is shuttered or a pulsed laser. The hologram may be written with a single pulse of no more than 150 ns or a sequence of pulses. Ideally, the field is lowered when the writing beams are turned off but some delay is tolerable and may be required by the addressing scheme. The low field is suitably set at or near the optimal field.

The voltage kick-off technique produces two separate unexpected results. First, when the writing beams are turned off and the electric field is lowered one would expect the diffraction efficiency to start to decline albeit possibly more slowly. However, the observed results are that the diffraction efficiency continues to increase in the dark until it reaches a maximum efficiency that is within a few percent of that achieved by writing at the optimal field until steady-state is achieved. Consequently, approximately the same diffraction efficiency can be achieved in a write cycle that is a fraction of the time required by the conventional technique. Second, because this approach achieves diffraction efficiencies comparable to the optimal field one would expect the decay and persistence to be comparable. However, the observed results are that the decay time constant is much larger. Consequently, we can achieve a much longer persistence without sacrificing diffraction efficiency or writing time. The voltage kick-off technique yields a FOM on the low end of at least 1,000, more typically at least 10,000 with expectations exceeding 100,000 as the technique is refined and PR polymer materials improve. Persistences of several hours to days are achievable.

The use of the voltage kickoff technique and its corollary advantages: faster writing, longer persistence and high diffraction efficiency; make possible the use of PR polymer recording media for a refreshable computer generated holographic 3D display. The recording device includes a photorefractive polymer situated between a ground electrode and a segmented high voltage electrode with one or more hogels defined for each segment of the segmented electrode. Computer generated images for multiple perspectives of a 3D object to be displayed are stored in memory for each hogel. Independently addressable voltages are applied to each segment of the segmented high voltage electrode to establish high electric fields above the optimal field across the photorefractive polymer. The recording device is translated so that the reference beam and objects beam (spatially modulated with the computer generated images) interfere at a first hogel for a first segment to record a hologram. This is repeated as necessary if there is more than one hogel per segment. After the writing beams are removed from the last hogel through translation and/or blanking of the beams, the voltage applied to the segment is reduced to switch the high electric field to a low electric field. Once the beams are removed and the field switched low, the diffraction efficiency for the hogel(s) in that segment will increase during the dark period. This process is repeated for each segment until holograms are recorded for all of the hogels for each segment to record the hologram for the 3D object.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 17 is a diagram of the read portion of the display; and

DETAILED DESCRIPTION OF THE INVENTION

The present invention provides an updateable system and method of recording a hologram on a photorefractive polymer that simultaneously reduces the writing time and increases persistence without sacrificing diffraction efficiency. This is accomplished with a voltage kick-off technique for controlling the bias electric field applied to a photorefractive polymer in coordination with the application of the writing beams and dark decay. Essentially the voltage kick-off technique applies a high electric field above the optimal field while the writing beams are on and reduces the electric field when the writing beams are off during dark decay. Known addressing techniques hold the applied field constant at the optimal field through writing and dark decay and apply the writing beams until steady-state is achieved. The voltage kick-off technique produces two separate unexpected results. First, when the writing beams are turned off and the electric field is lowered the diffraction efficiency continues to increase until it reaches a maximum efficiency that is within a few percent of that achieved by writing at the optimal field until steady-state is achieved. Second, the decay time constant is much larger than expected producing a much longer persistence without sacrificing diffraction efficiency or writing time. The voltage kick-off technique yields a FOM on the low end of at least 1,000, more typically at least 10,000 with expectations exceeding 100,000 as the technique is refined and PR polymer materials improved. Persistences of several hours to many days are achievable.

Figure 6:
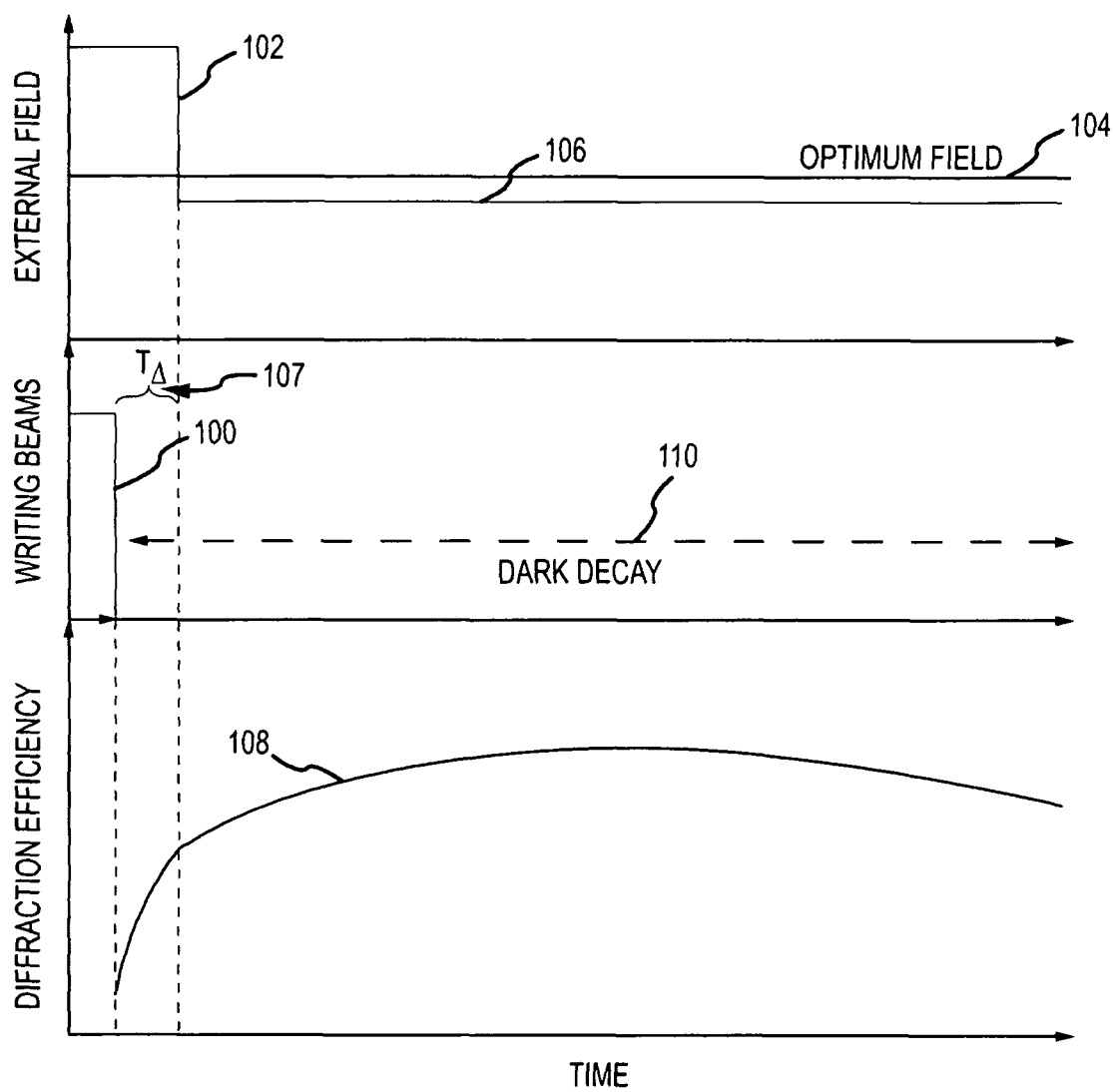
FIG. 6 illustrates the voltage kick-off technique in accordance with the present invention that exploits the photorefractive effect to record a hologram on the photorefractive polymer.

As shown in FIG. 6, the voltage kick-off technique uses an object beam that interferes with a reference beam (the "writing" beams 100) at the photorefractive polymer to record a hologram while applying a high electric field 102 above the optimal electric field 104 across the photorefractive polymer. The high field is preferably as high as possible without inducing dielectric breakdown. The writing beams are removed (pulsed with a low repetition rate, pulsed with a high repetition rate while blanking unwanted pulses, shuttered CW beam, translated to the next hogel) prior to reaching a steady-state diffraction efficiency. The write cycle is typically a fraction of the write time that would be required to reach steady-state at either the optimal or high electric field. When the writing beams are removed, the electric field is reduced to a low electric field 106 suitably below or close to the optimal electric field 104. Ideally the time interval TA 107 between the moment when writing beams are turned off and when the field is reduced should be as small as possible. If the field is lowered before the writing beams are removed the holograms will be erased. When the writing beams are removed and the field switched low, the diffraction efficiency 108 continues to increase during the dark decay period 110 reaching a maximum (steady-state plateau) that is significantly higher than the maximum achievable by writing at a high electric field until steady-state is reached and is close (within a few percentage points) to the maximum achievable by writing at the optimal electric field until steady-state is achieved.

This voltage kick-off technique strategy has three advantages. First, the writing time, defined as the time during which the writing beams are on, is dramatically reduced. A typical writing time for a CW laser is less than 25% (conservative value), and more typically less than 10% of the time required to write with the optimal electric field to steady-state. Second, the decay time, defined as the time required after the writing beams are switched off for the efficiency to drop to 10% is considerably enlarged. Third, the efficiency achieved during the dark decay is comparable to that achieved with the optimal field. Note that for pulsed writing, the pulse by its very nature achieves a small writing time (e.g. less than 150 ns); while the remainder of the voltage kick-off process is executed in the same manner as for CW writing to achieve large persistence. Pulsed lasers are more powerful and can produce more charge carriers in a short write cycle than CW lasers. Currently available PR polymers have relatively low photosensitivity making pulsed lasers an attractive source. As the PR polymers are improved and made more sensitive CW lasers may become more attractive as they are cheaper, more coherent, easier to use and do not have the same safety issues as pulsed lasers.

Figure 7:
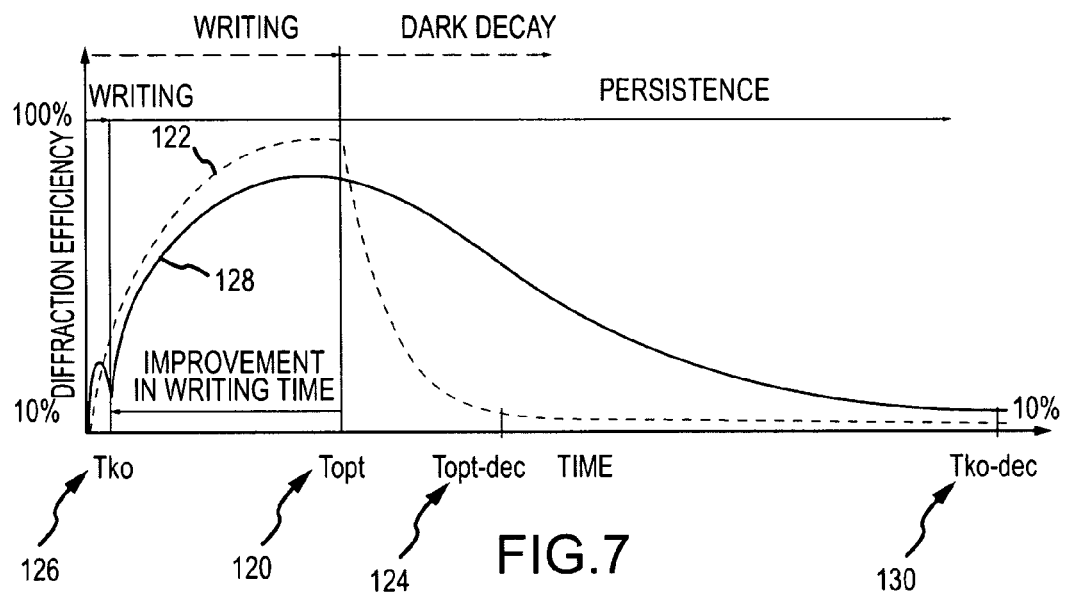
FIG. 7 is a plot comparing the temporal response of the diffraction efficiency for conventional writing at the optimal electric field and voltage kick-off writing in accordance with the present invention.
Figure 8:
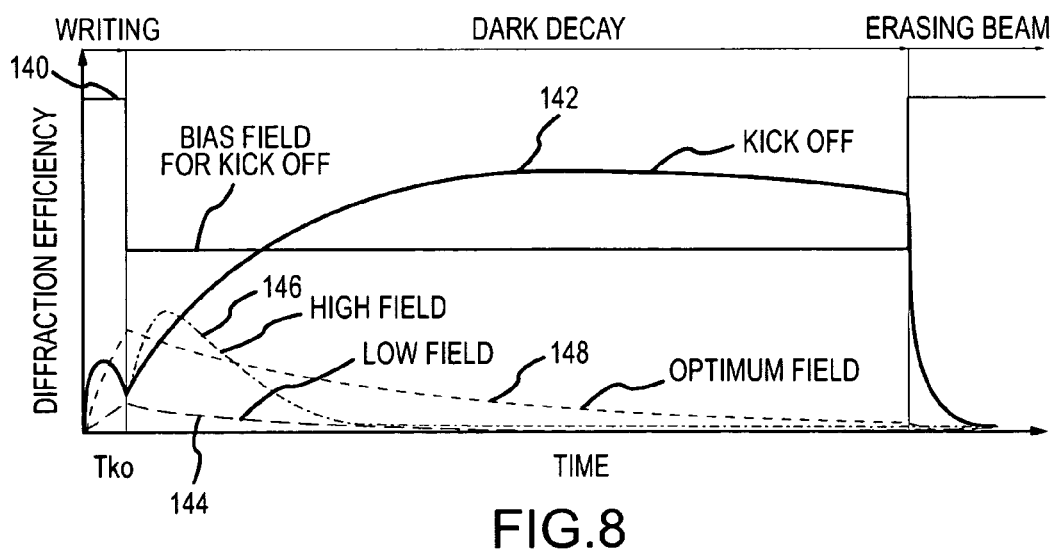
FIG. 8 is a plot comparing the temporal response of the diffraction efficiency for rapid writing using low, optimum and high fields and voltage kick-off writing in accordance with the present invention.

These advances are readily apparent in FIGS. 7 and 8 which compare the performance of the voltage kick-off technique to the conventional recording technique at the optimal field and a technique of reducing the write time without changing the electric field, respectively, for a particular CW laser. The latter technique is not used or proposed, but merely included for comparison purposes. As shown in FIG. 7, for the conventional recording technique the field is held constant throughout at the optimal field value. The writing beams are applied for a time Topt 120 until the diffraction efficiency 122 reaches steady-state. When the writing beams are turned off at Topt 120 the diffraction efficiency immediately starts to decrease and decays to 10% at Topt-decay 124. The FOM is approximately 1 in this example. By comparison, for the voltage kick-off technique, the writing beams are applied for a time Tko 126 at which point the diffraction efficiency 128 is quite low, approximately 15% in this example. However, the diffraction efficiency continues to increase until it reaches a maximum a few percentage points below the optimal. Once the maximum is reached, the efficiency starts to decay but with a much larger time constant not reaching 10% until Tko-decay 130. The FOM is approximately 100 in this example.

As shown in FIG. 8, the writing beams 140 are applied for a time Tko at which point the diffraction efficiency is quite low. The diffraction efficiency 142 for the kick-off voltage technique responds by increasing to a maximum value in the dark and slowly decaying. By contrast, if the applied field albeit low, high or optimal is maintained constant throughout the writing and dark decay the diffraction efficiencies 144, 146 and 148, respectively, do not increase and decay rapidly. The efficiency for the high field increases a little immediately after the writing beam turns off but decays rapidly. This comparison clearly demonstrates that the coordination of the writing time and transition of the field from a high field to a low field is critical to achieving both high diffraction efficiency and long persistence with reduced writing time. It is not sufficient to simply reduce the writing time. As mentioned before, if one were to reduce the applied field while writing this would have the effect of erasing the hologram.

The voltage kick-off technique was discovered while performing experiments on a PR polymer. We observed that when the writing beams were turned off after a short write cycle and the field lowered that the diffraction efficiency continued to increase and the persistence was much greater. From a material point of view, the mechanisms that produce these unexpected but desirable results are not completely understood. However, the mechanisms may be understood and possibly explained as follows.

Figure 5:
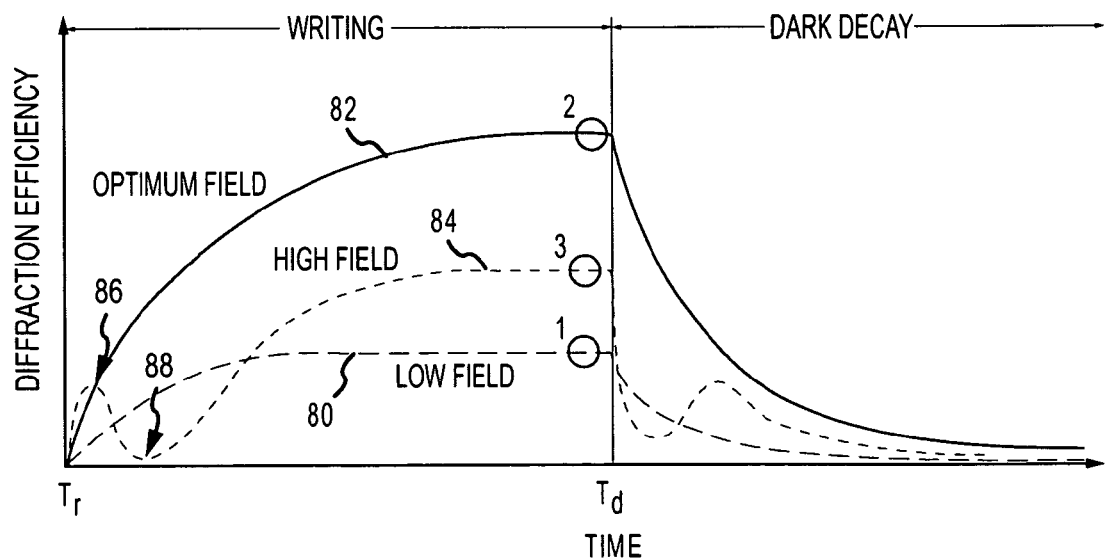
FIG. 5, as described above, is a plot of the temporal response of the diffraction efficiency as a function of the applied bias electric field.

Under high field writing, charge carriers are efficiently generated which creates a large space-charge-field. The space-charge field is so large and forms so rapidly that the chromophores in the PR polymer are unable to orient quickly enough and their distribution is broad. As a result the diffraction efficiency remains low. This is confirmed by the observation of the small first maximum 86 in the dynamic measurement of the diffraction efficiency at high field (see FIG. 5). Indeed, theory predicts a first maximum as high as what it is observed at saturation with the optimum field (nearly 100% neglecting losses and Bragg mismatch). When the writing beams are turned off, the chromophores continue to orient in the space charge-field and their distribution becomes narrower causing the efficiency to increase. Subsequently reducing the bias field decreases the space-charge field. However, this reduction is not large enough to induce a decrease of the index modulation since the chromophores keep orienting as evidenced by the fact that the efficiency keeps increasing after reduction of the external field. The dark decay occurs due to erasure of the space charge-field caused by thermally activated charge recombination. The chromophores subsequently reorient and the index modulation decreases, reducing the efficiency. In the case of the kick-off technique a high density of charges has been generated and a strong space-charge field built up, hence more time is required to erase the field. In summary, there are several phenomena occurring in photorefractive polymers: charge generation, displacement, trapping, chromophore orientation (during writing); charge detrapping, charge recombination, chromophore randomization (during dark decay). All of these phenomena have associated time constant(s) and probability distributions. Optimization of the kick-off technique to achieve shorter write times and longer persistence will require matching of those time constants and distributions by changing material parameters together with the writing time and voltage manipulation.

Typical parameter ranges and optimization of the writing time, field transition and high and low field values for a particular PR polymer are investigated in FIGS. 9-12.

Figure 9:
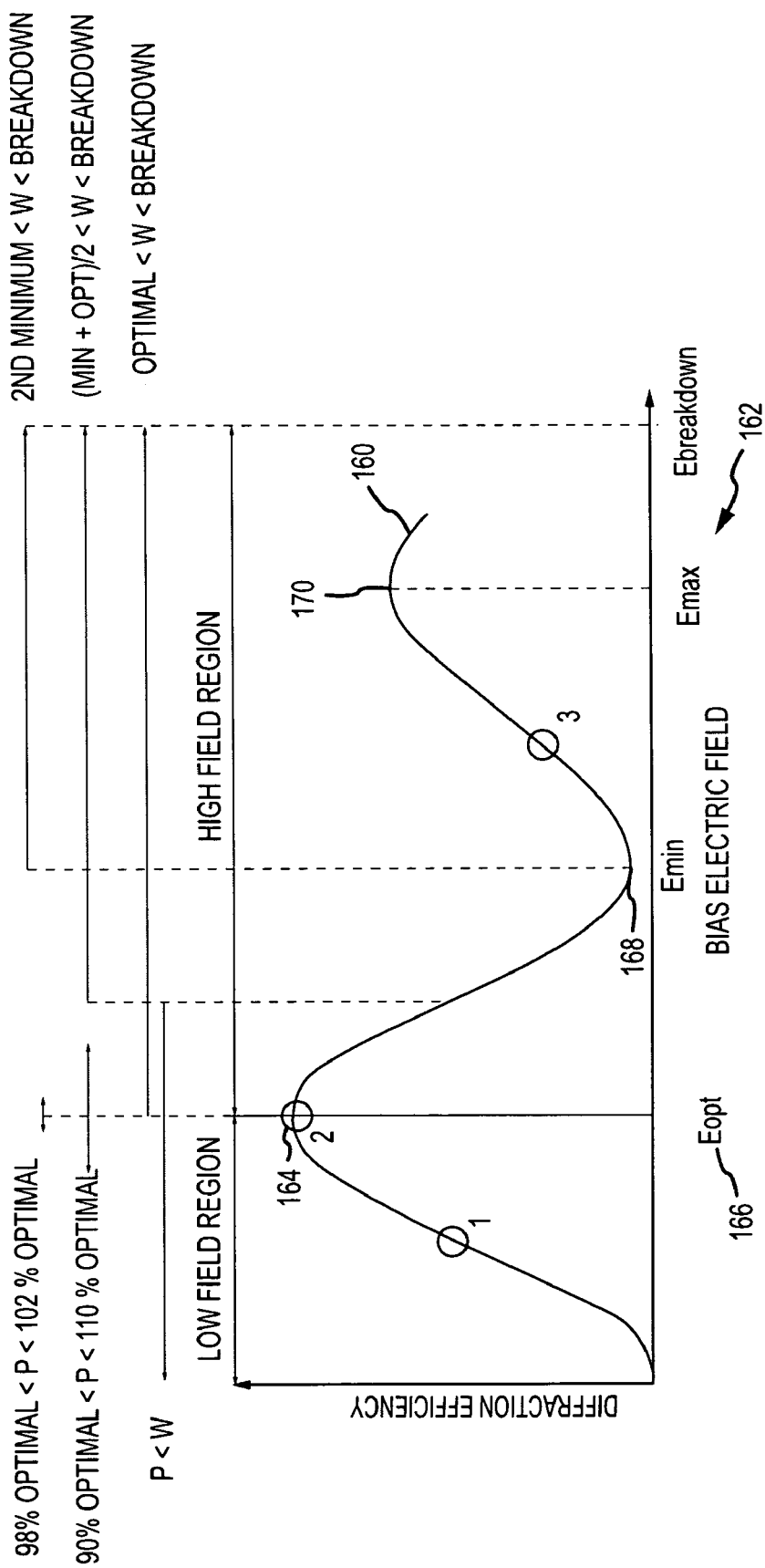
FIG. 9 is a plot of diffraction efficiency for a photorefractive polymer as a function of the applied bias electric field illustrating typical high and low field values applied to the PR polymer.

As shown in FIG. 9, in PR polymer materials, the diffraction efficiency 160 according to the applied bias electric field 162 is a periodic function having a first maximum 164 at the optimal electric field Eopt 166, a second minimum Emin 168 and a second maximum Emax 170. At a minimum, the high electric field "W" must be greater than optimal electric field Eopt and less than the breakdown electric field Ebreakdown. The breakdown electric field varies from sample to sample and is not precisely known so a conservative value is typically used for the upper bound. The high field value is preferably set as close to the upper bound as possible for the fastest write times. High field values between (Eopt+Emin)/2 and Ebreakdown are typical. High field values between Emin and Ebreakdown may be preferred. At a minimum, the low electric field "P" is lower than the high electric field "W". The low field may be significantly lower than Eopt but this sacrifices diffraction efficiency. Low field values of Eopt plus/minus 10% are typical and in some cases values approximately equal to Eopt (plus/minus 2%) are preferred to achieve the highest diffraction efficiency. Currently, the high and low field values are set by trial and error. Ultimately, mathematical modeling and independent measurement of material and setup parameters could lead to a more precise determination of the optimum parameters for a particular PR polymer and application.

The optimum writing time for the kickoff technique depends on several material and setup parameters, like material response time, dark decay time, optimum field, writing beam intensity . . . . The time at which the writing beams are switched off and the field is reduced can be set to a wide range. However, to achieve the best performance, this time must be tuned precisely according to material and setup parameters. Currently, optimum writing time is set by trial and error. Ultimately, mathematical models and independent measurement of material and setup parameters could lead to an exact prediction of the optimum writing time.

Figure 10:
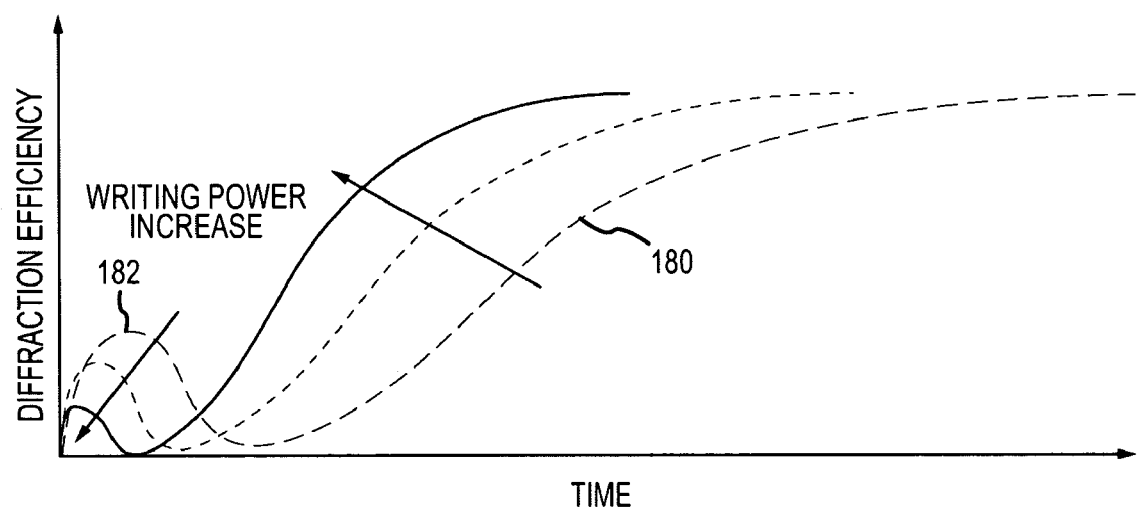
FIG. 10 is a plot of the temporal response of the diffraction efficiency illustrating the diffraction efficiency dynamics as a function of writing beam power.

The writing dynamics for different laser powers are illustrated in FIG. 10. The dynamics of the diffraction efficiency 180 depends on the writing beams' powers. Indeed, the initial slope increases and the steady state plateau is reached sooner when writing power increases. In the case of writing with a high electric field (above optimum), the earliest peak 182 in the diffraction efficiency diminishes as the power increases. This is because the diffraction efficiency depends on chromophore orientation which is slower than space-charge field formation. The extreme case of high field writing occurs when writing with a single pulse from a pulsed laser, with a pulse length generally on the order of 1-150 nsec in which case the first maximum vanishes.

Figure 11A:
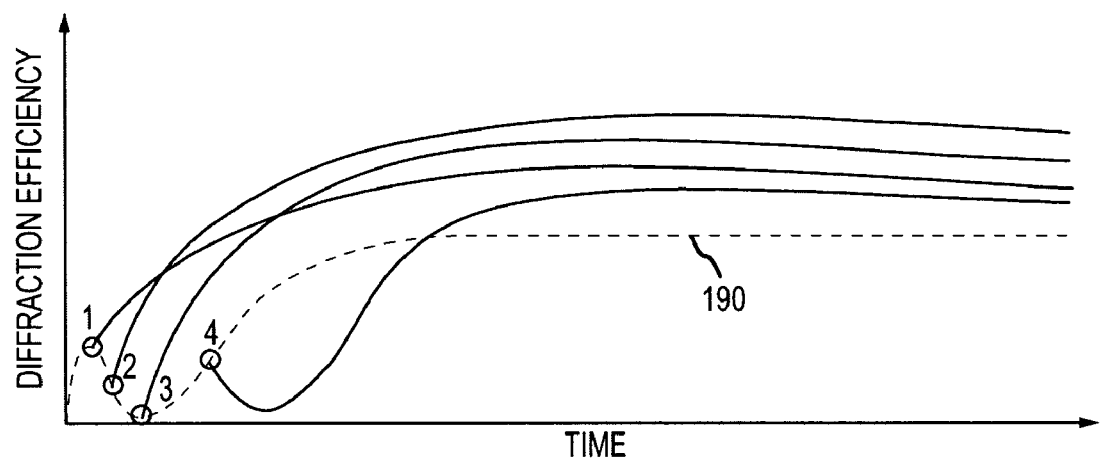
FIGS. 11a and 11b are plots of the temporal response of the diffraction efficiency illustrating the diffraction efficiency dynamics as a function of the time of removing the write beam for a CW laser of a given wavelength and intensity (power/area) and for a pulsed laser.

FIG. 11a shows different diffraction efficiency dynamics examples for different writing times before switching off the writing beams and reducing the voltage. This plot is for a specific CW laser (wavelength and intensity); high electric field set above the second minimum and low electric field at the optimum and assuming the field is reduced at the same time the writing beams are turned off. The diffraction efficiency dynamics curve 190, which assumes that the electric field is held constant at the high electric field and the writing beams left on until steady-state is reached, is provided for reference. To achieve the best performance (2), the writing time has to be tuned precisely according to material and setup parameters. If the writing time is too small (1) or too large (3, 4) the efficiency will be lower and persistence smaller. In this specific example, the optimum is approximately midway between the first maximum and second minimum. In general for a CW laser, the optimal writing time will occur after the $1^{st}$ peak and prior to reaching steady-state. Writing times between the $1^{st}$ peak and the $2^{nd}$ minimum provide both short writing times and high diffraction efficiency.

Figure 11B:
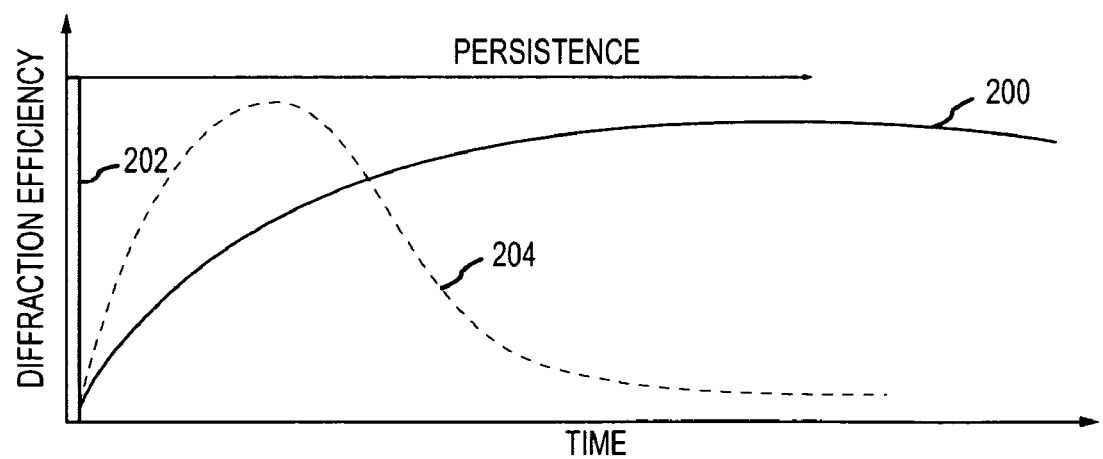

FIG. 11b shows the dynamic diffraction efficiency 200 for a single pulse 202 with a pulse length generally on the order of 1-150 nsec. The electric field is high during the pulse and switched low as soon as the pulse ends. A CW laser is chopped extra cavity while a pulsed laser is intra-cavity chopped in some way. In the case of a pulsed laser there is a temporal modulation of the cavity gain. The first maximum is no longer observable but one can observe an increase in diffraction efficiency well after the writing pulse is over. This is due to the fact that the space-charge field is generated rapidly by the light, but it takes more time for the chromophores to orient. Superimposed on the build up of the index modulation (chromophore orientation) is the dark decay of the space charge-field, which is responsible for the limited persistence. By comparison, if the electric field is maintained at the optimal electric field throughout, the persistence of the diffraction efficiency 204 is much smaller.

Figure 12:
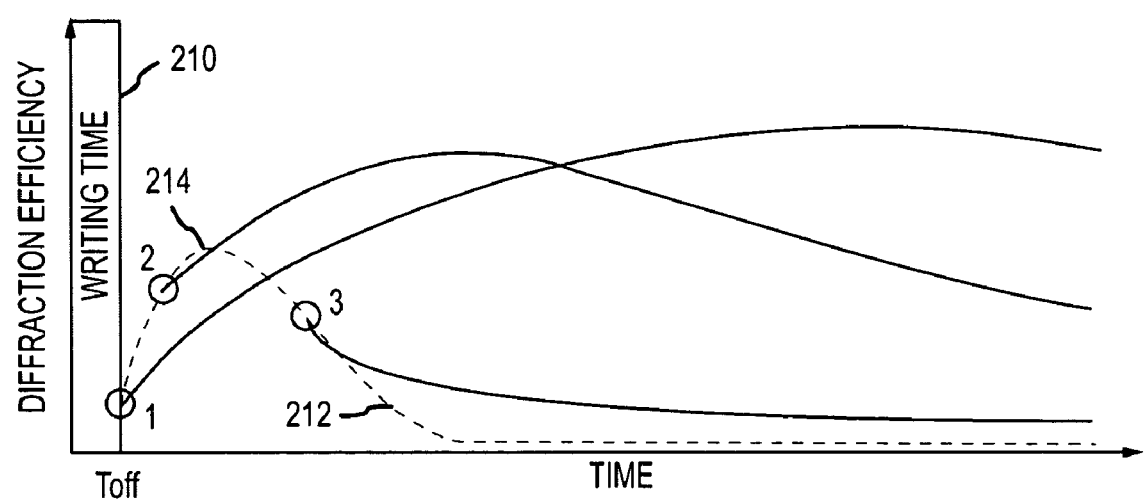
FIG. 12 is plot of the temporal response of the diffraction efficiency illustrating the diffraction efficiency dynamics as a function of the delay between removing the write beam and switching the applied electric field from high to low.

The reduction of the external electric field should preferably occur as soon as possible after the writing time, ideally at the same time as shown in FIG. 12. In some addressing schemes, e.g. multiple hogels that are separately addressed by the writing beams with an electric field established by a single electrode, the field cannot be reduced when the writing beams are removed. The writing beam 210 is turned off at Toff. If the high field is not switched low the dynamic diffraction efficiency follows curve 212 (small increase in diffraction efficiency followed by a rapid decay). If the field is switched low when the writing beams are removed (1), the diffraction efficiency and persistence are maximums. As the delay increases the diffraction efficiency and persistence drop. Delays less than the peak 214 are preferred. However, in, for example, a 3D holographic display if some of the early hogels have longer delays the degradation in image quality and persistence may be tolerable.

Updateable 3d Computer Generated Holographic Display

The use of the voltage kickoff technique and its corollary advantages: faster writing, longer persistence and high diffraction efficiency; make possible the use of PR polymer recording media for some applications including a refreshable holographic 3D display and holographic optical data storage. The display is a form of data storage using the human eye for decoding the data, the only significant difference being that data storage requires very long, theoretically infinite, persistence.

For a refreshable holographic 3D display, the hologram must be written as fast as possible, should be able to be read for as long as possible and then erased at will. The technique may be applied to either classic holography in which the object beam is scattered from an object in order to recreate a hologram of the object or computer generated holography in which images are generated and used to directly modulate the object beam. In classic holography the entire hologram is written at once as if it consists of one large hogel (holographic pixel). In computer generated holography, the 3D display includes multiple hogels that are each written independently. The hogels may be configured for full-parallax imaging or horizontal parallax only (HPO) imaging, which is an effective approximation to full-parallax imaging, as humans perceive depth using horizontally-offset eyes. The use of HPO recording helps in significantly reducing the number of hogels in a 3D display, resulting in shorter total writing times. The described 3D display implements HPO.

As an overview, 2D perspective views of the object of interest are generated from a 3D computer model. The 2D perspectives can also be generated using methods like magnetic resonance imaging (MRI), CAT scan, confocal microscopy, or aerial and satellite imaging. The perspectives are then divided or "sliced" into multiple 2D image planes. The image planes are re-organized using a computer algorithm in 2D matrices (the hogel data), which are then uploaded to a spatial light modulator (SLM). The reflective SLM that is illuminated with a laser beam displays the hogel data in sequence with the translation stages and electro-optic laser shutters. The laser beam modulated by the SLM (object beam) illuminates the pre-defined hogel area on the PR polymer device. A coherent reference beam simultaneously illuminates the same area, which facilitates the recording of the hogel through interference with the object beam and the PR effect. After one hogel is recorded the shutter turns off the laser beams, the polymer device is translated to the next hogel position, and new hogel data is uploaded to the SLM. The holographic display is viewed using light from an expanded, low power monochromatic light source in transmission geometry. The voltage kick-off technique is used to control the write cycle of the writing beams and the fields applied to the PR polymer device.

An embodiment of a 3D computer generated holographic display 300 using HPO imaging with a CW laser source is illustrated in FIGS. 13 through 18. Variations for full-parallax imaging and pulsed laser sources are well understood. For clarity the presentation of display 300 is divided into the PR polymer recording device 302 and the functions of writing, reading and the control electronics 304 that implement the voltage kick-off technique.

PR Polymer Recording Device

Figure 1:
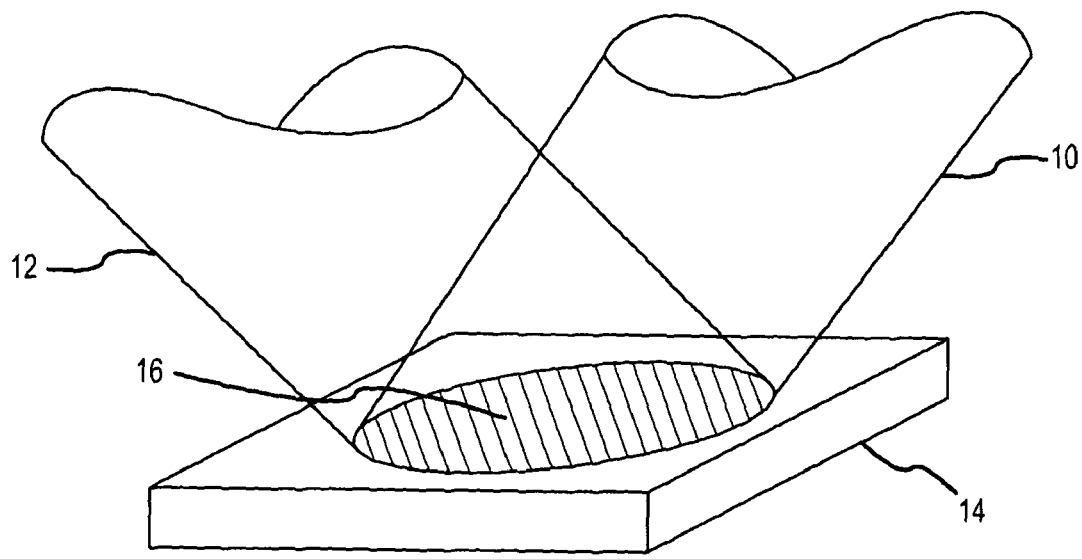
FIG. 1, as described above, is a diagram illustrating the recording of a hologram on a light sensitive material.
Figure 2:
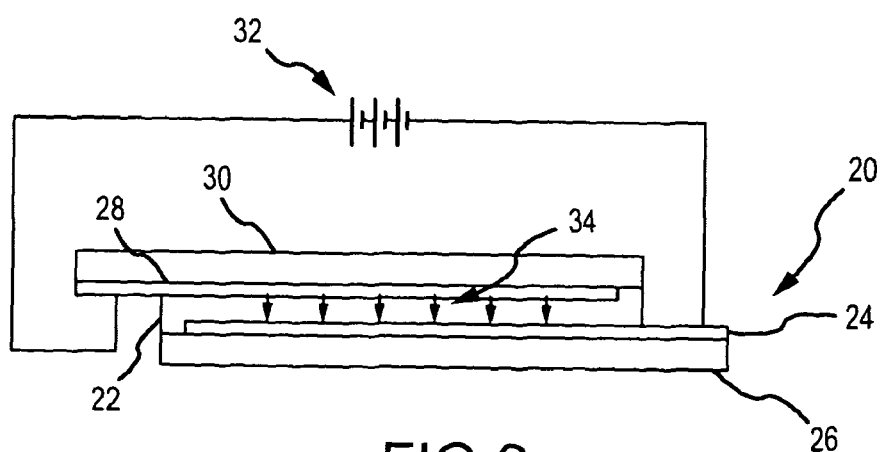
FIG. 2, as described above, is a diagram of a photorefractive polymer and electrode structure for applying the bias electric field.
Figure 3:
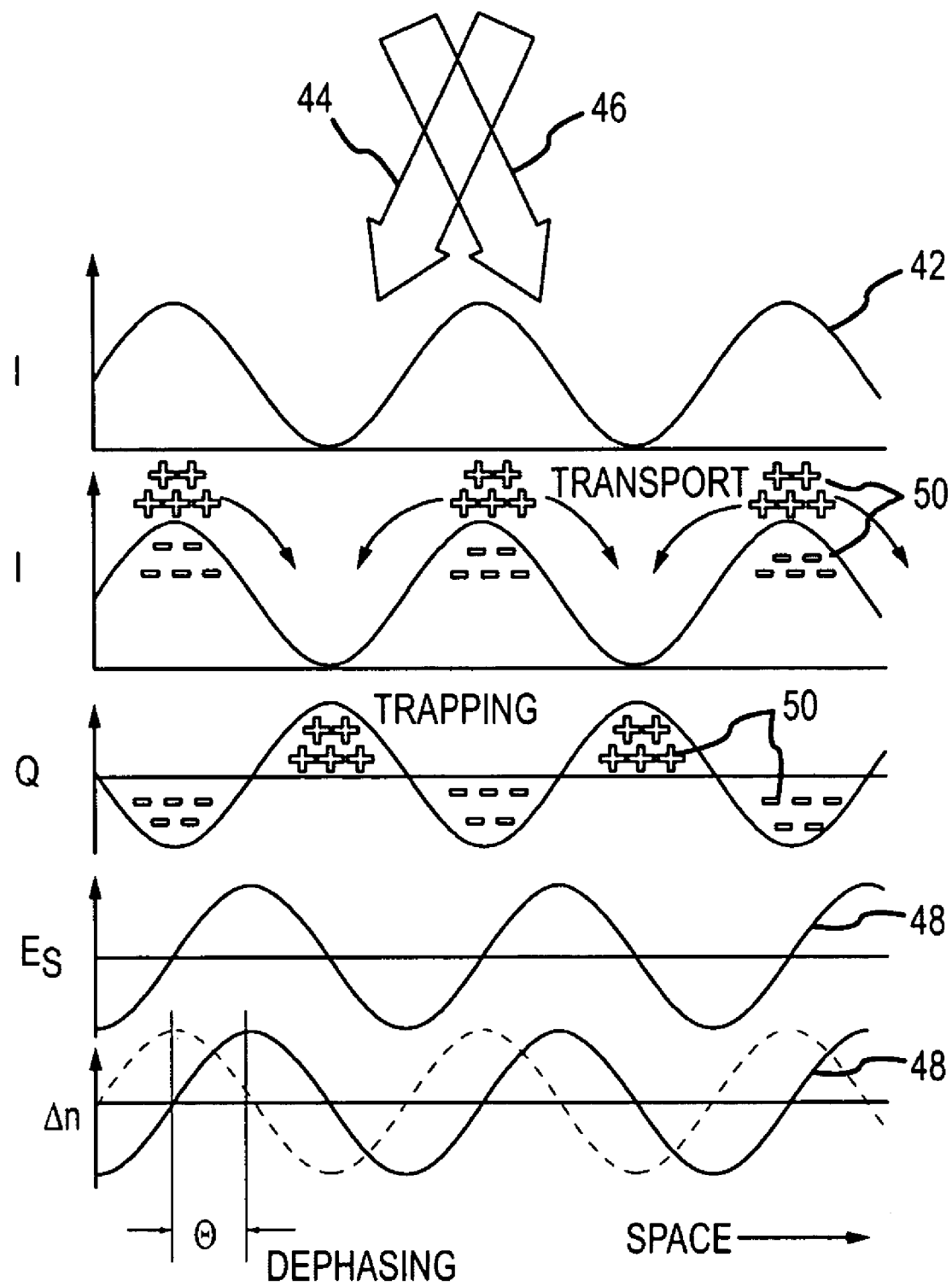
FIG. 3, as described above, is a diagram illustrating the photorefractive effect caused by interfering two coherent light beams at a writing location on the photorefractive polymer.
Figure 4:
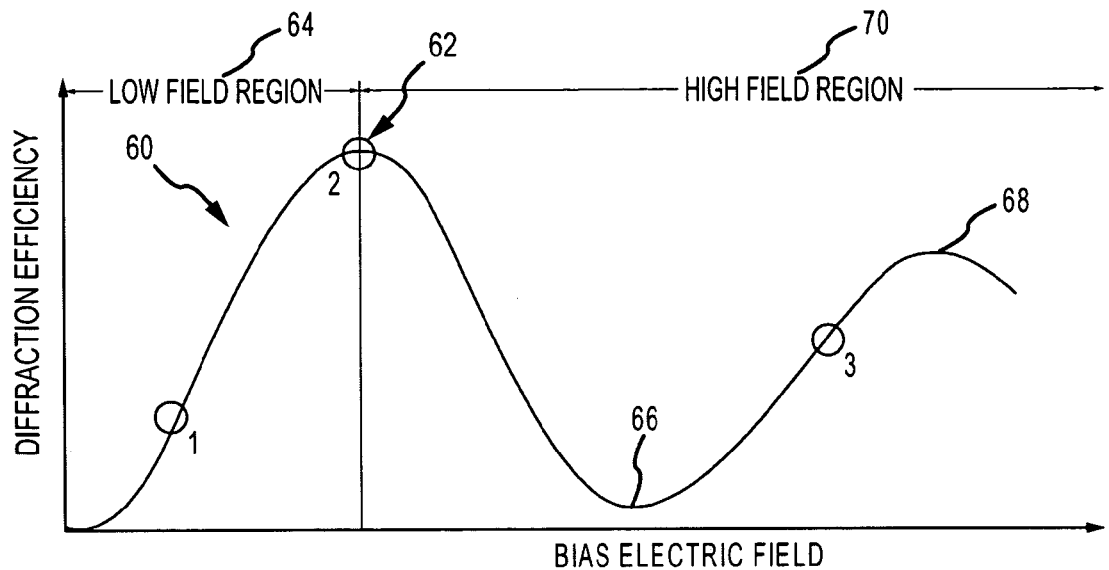
FIG. 4, as described above, is a plot of diffraction efficiency for a photorefractive polymer as a function of the applied bias electric field.
Figure 14:
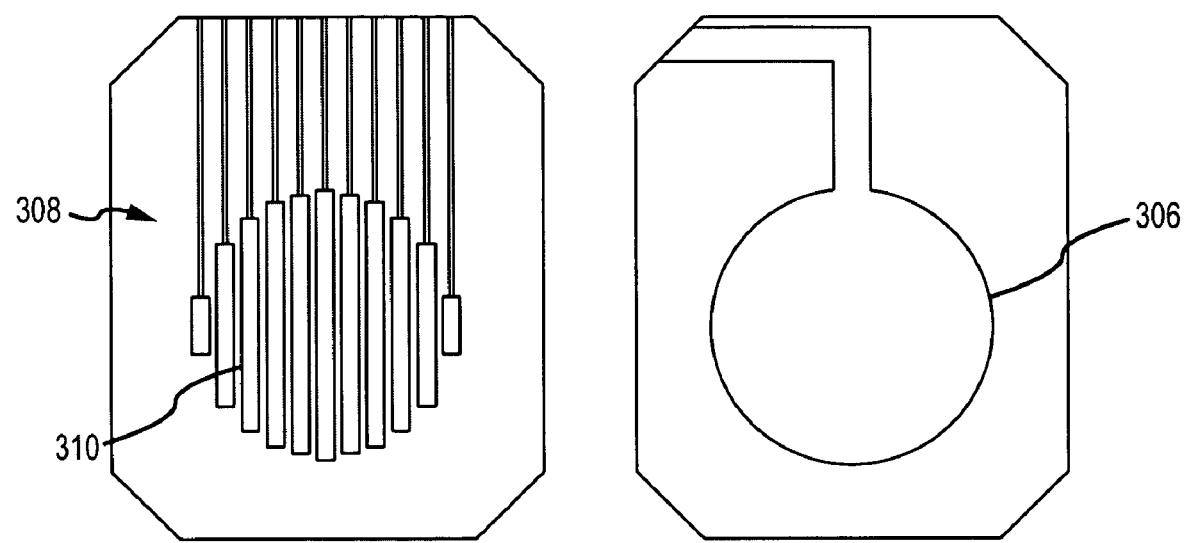
FIG. 14 is a diagram of an embodiment of the segmented high-voltage and ground plane electrodes.

PR polymer recording device 302 is similar to the device illustrated in FIG. 2 including a PR polymer sandwiched between a ground electrode 306 and a high voltage electrode 308. The ground electrode 306 is typically a single electrode. In this embodiment, the high voltage electrode 308 is segmented in horizontal stripes 310 that match the horizontal hogels for HPO imaging as shown in FIG. 14. Each horizontal stripe may cover one or more horizontal hogels. Alternately, the high voltage electrode could be unsegmented or segmented with multiple rectangles per row and column, each covering one or more hogels. The PR polymer recording device is mounted on a multi-axis translation stage 312 to translate the media for both writing and reading. The recording device 302 is depicted for purposes of illustration in both writing and reading positions.

The PR polymer may be a completely polymerized system such as copolymers and terpolymers or a so-called guest host composite systems comprising a host polymer into which low molecular weight compounds are mixed. It is also possible to have copolymers mixed with several guests which are intermediate between these two limits.

An example of a guest/host PR polymer is a copolymer with a polyacrylic backbone that was used to attach pendant groups, tetraphenyldiaminobiphenyl-type (TPD) and CAAN in the ratio 10:1 (PATPD-CAAN) by the synthetic modification of the PATPD polymer. The host PATPD-CAAN copolymer provides the optical absorption and charge generation/transport at the writing wavelength (532 nm). A plasticizer, 9-ethyl carbazole (ECZ) was added to the composite. The NLO properties are achieved by adding a fluorinated dicyanostyrene (FDCST) chromophore. The composite PATPD-CAAN:FDCST:ECZ (50:30:20 wt %) was formed into thin-film devices by melting it between two indium tin oxide (ITO) coated glass electrodes with a thickness of 100 μm set by glass spacer beads. The PR thin-film devices show near 90% diffraction efficiency at an applied voltage of 4 kV in steady-state four-wave mixing (FWM) measurements. The two-beam coupling (TBC) gain coefficient for these devices at 5 kV is around 200 $cm^{-1}$. The device shows no degradation or dielectric breakdown for extended periods of usage (several months) in display recording experiments, with hundreds of write/erase cycles every month at high applied voltages (9 kV) and optical intensities around 100 mW/$cm^2$. As described in pending PCT Application PCT/US2008/050056 filed Jan. 2, 2008 by Nitto Denko Technical Corporation entitled "Systems and Methods for Improving Performance of a Photorefractive Sample" a buffer layer of a polymer dielectric may be added to the PR polymer. Experiments have shown that the buffer layer increases the breakdown voltage.

Writing

Figure 15:
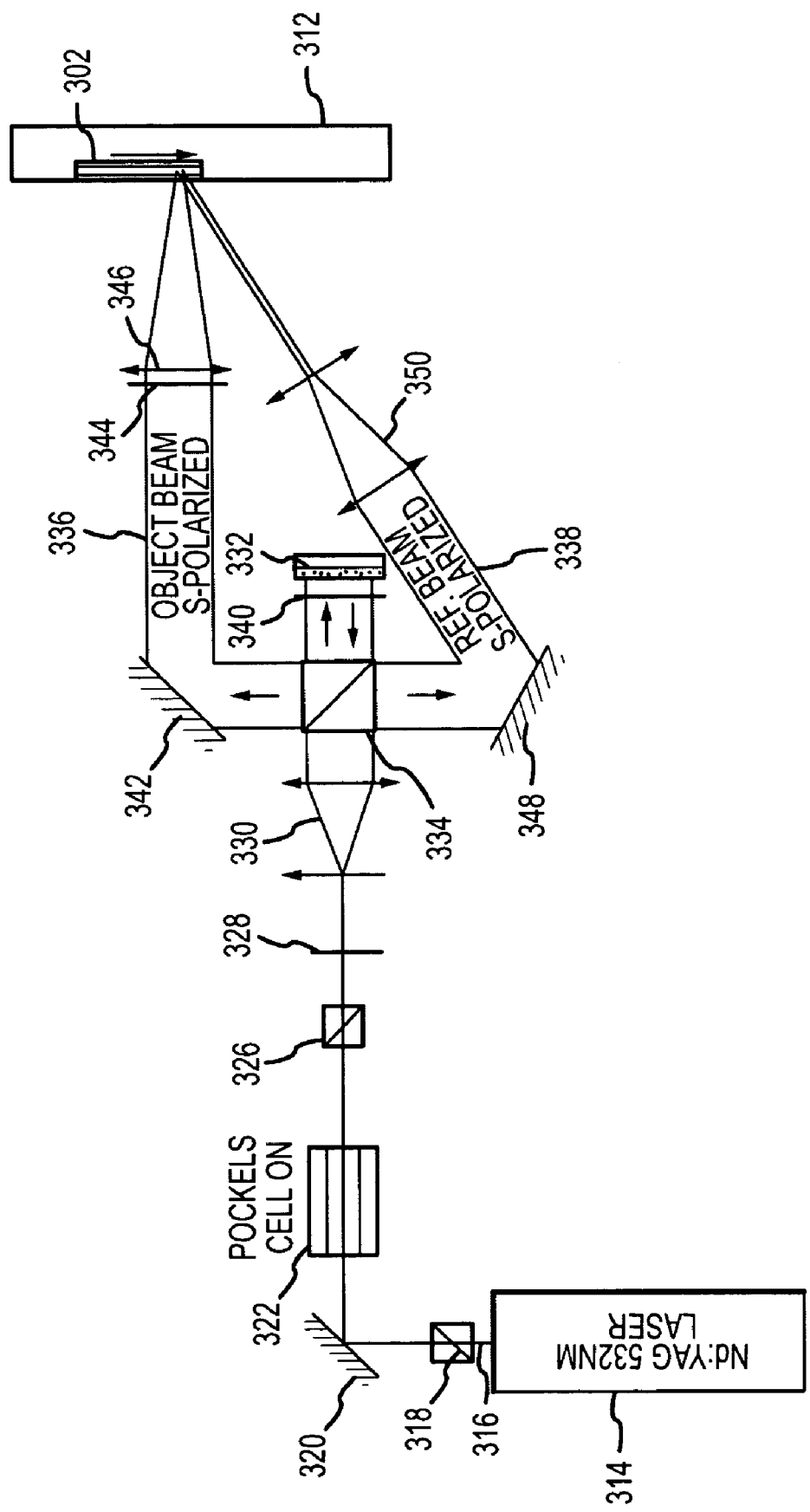
FIG. 15 is a diagram of the write portion of the display.

As shown in FIG. 15, a laser light source 314 such as a frequency doubled Nd:YAG laser at 532 nm emits a coherent beam 316 that is direct through a polarizer 318 that linearly polarizes the beam, which is directed off a mirror 320 to a Pockels cell 322 that is controlled by a high voltage supply 324 and control electronics 304. The Pockels cell rotates the linear polarization by 90° when an electric field is applied to control beam direction for writing or blocking/erasing. A polarizing beam splitter 326 selects the beam path according to its polarization (writing or erasing). A half wave plate 328 rotates the linear polarization by a given angle to control the intensity ratio between the object and reference beam. A beam expander 330 aka a telescope constituted by two lenses expands the beam diameter to fit the size of a spatial light modulator (SLM) 332. A polarizing beam splitter 334 separates the incoming beam 316 into the "object" beam 336 and the "reference" beam 338.

Object beam 336 passes through a quarter wave plate 340 that changes the incoming linear polarized light into circular polarized light. Reflective SLM 332 (e.g. a reflective liquid crystal display) modulates the object beam intensity in accordance with the computer generated images stored in memory 341 for the current hogel. The beam coming back from the SLM passes through the quarter wave plate 340 a second time and its polarization again becomes linear but with a 90° rotation from its initial linear polarization. The beam is reflected by the beam splitter cube 334 off a mirror 342 to direct the beam through a diffuser 344 that scatters the light into a given angle and a lens 346 that focuses the beam onto the PR polymer at a given angle and location. The polarizing elements are set so that the object beam is s-polarized at the sample location. Reference beam 338 is directed off mirror 348 to the PR polymer at a given angle. A telescope 350 reduces the size of the reference beam to the size of the holographic pixel to be written. The polarizing elements are set so the reference beam is s-polarized at the sample location. The control electronics 304 controls the high voltage supply 370 to set the field across PR polymer recording device 302 to a high field value during writing and to a low field value during dark decay as described previously. The high voltage supply applies different DC voltages between the different segments of the high-voltage electrodes and the ground electrode to independently establish an electrical field across the photorefractive polymer in each electrode segment. The applied voltages are "different" in that they are independent of each other. In the kick-off voltage technique the voltages are typically switched between a high value and a low value.

To write a sequence of hogels on the recording device, initially the Pockels cell is off, the shutter is closed and no light arrives at the device. High voltage is now applied to the device. The device is moved to the first hogel position. The first image is loaded into the SLM. The Pockels cell is turned on and the writing beams write the first hogel into the device. The Pockels cell is switched off after the writing time. The sample is moved to the second hogel position. The second image is loaded into the SLM and the Pockels cell is turned on to write the second hogel into the sample and so on up to the last hogel. Although it is preferable to switch the Pockels cell off to remove the writing beams before translating the recording device (to avoid crosstalk etc.), if the translation stage is fast enough it may not be necessary. Translation itself can be used to remove the writing beams. In the case of a pulsed laser, the Pockels cell is not required to turn the beam off at a desired time but may be used to blank unwanted pulses depending upon the repetition rate of the pulsed laser. For example, a single pulse may be used to record the hologram. The Pockels cell would be turned off after the first pulse to blank subsequent pulses until the recording device is translated to the next hogel. After the last hogel for each segment is written, the bias electric field applied to the corresponding segment 310 of the segmented electrode 308 is reduced to the low field. Once the last hogel for the last segment has been recorded the device is moved to the reading position.

Figure 16:
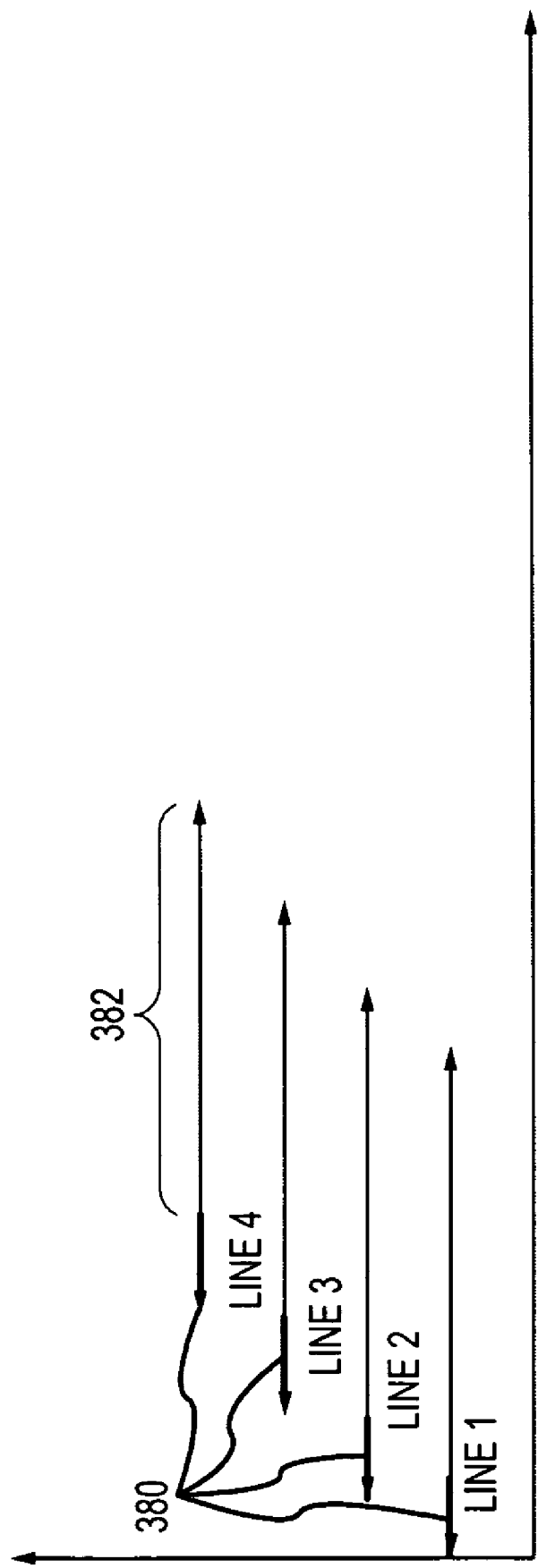
FIG. 16 is a diagram illustrating the addressing scheme for writing the segmented high-voltage electrode.

The benefits of the reduced writing time associated with the voltage kick-off technique for a 3D holographic display are clearly shown in FIG. 16. Each hogel (or line) 380 is written for a short period of time and then the translation stage indexes the device so that the next hogel is written. While the system is writing the next hogel and several ho gels thereafter, the diffraction efficiency for the already written hogels continues to increase over a dark build-up period 382 until the maximum is reached. When writing a 3D display with hundreds to potentially millions of hogels, the cumulative benefit of the short write cycle is dramatic without sacrificing the diffraction efficiency.

Reading

As shown in FIG. 17 a monochromatic light source 360 (not necessarily a laser) generates a light beam 362 that is directed through a polarizer 364 so that the reading beam isp-polarized at the recording device location; a beam expander 366 aka a telescope constituted by two lenses is used to expand the beam diameter to fit the size of the device. The incident angle of the reading beam should be chosen according to the Bragg diffraction law and the wavelength difference between writing and reading beams. The reading beam passes through the recorded holograms on recording media 302 producing a diffracted beam 368 that the viewer sees as the 3D holographic image. Control electronics 304 maintain the voltage at the low field value during reading.

Erasing

To erase the image before it is gone due to dark decay, the bias electric field across the PR polymer is set to high and the erasing beam is turned on (shutter open). Once the image has disappeared, the erasing beam is switched off.

Figure 18:
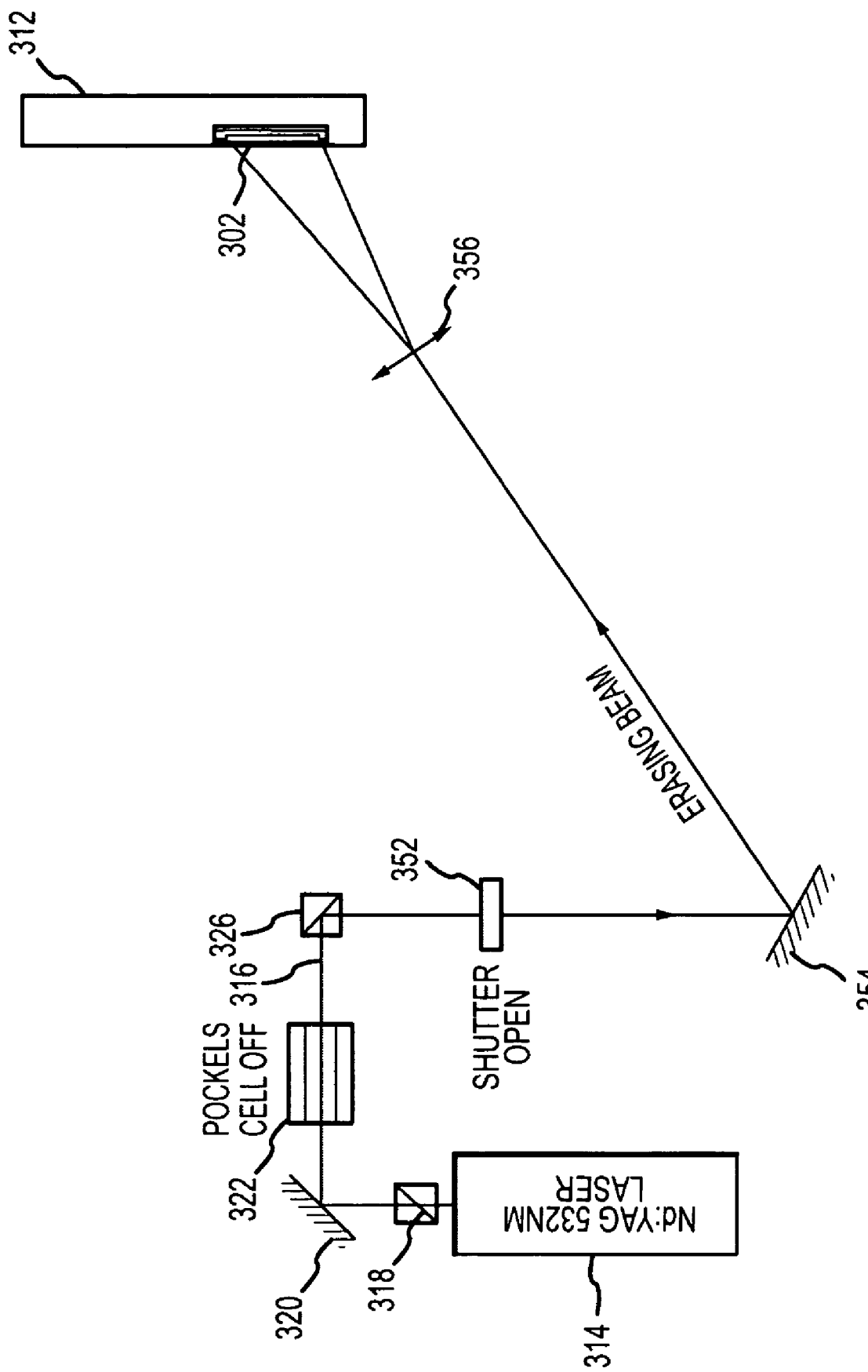
FIG. 18 is a diagram of the erase portion of the display.

The erasing beam does not need to be coherent or monochromatic, but must contain wavelengths at which the PR polymer can absorb light and generate charge. In this embodiment, as shown in FIG. 18 beam 316 is used to both write and erase the hologram. Control electronics 304 set high voltage supply 324 to turn the Pockels cell 322 off. Beam 316 is the directed through an open shutter 352 that switches the beam on and off, off a mirror 354 to orient the beam to the recording device and through a lens 356 to expand the beam to the size of the recording device or portion of the device to be erased. Control electronics 304 set the voltage and field across the PR polymer recording device high to erase.

Control Electronics

Control electronics 304 unit aka a computer controls the high voltage supply 324 that addresses the Pockels cell, controls shutter 352 of the erasing beam, controls the spatial light modulator 332 by providing the image from memory 341, controls the multi-axis translation stage 312 to position the device for writing and reading and controls a high voltage supply 370 that applies the bias voltage to the recording device to set the high and low electric fields. By controlling the activation of the Pockels cell to turn the write beams off between hogels, the translation stage to reposition the device to the next hogel and the high and low electric fields applied to the device, the control electronics implement the voltage kick-off technique.

Figure 13:
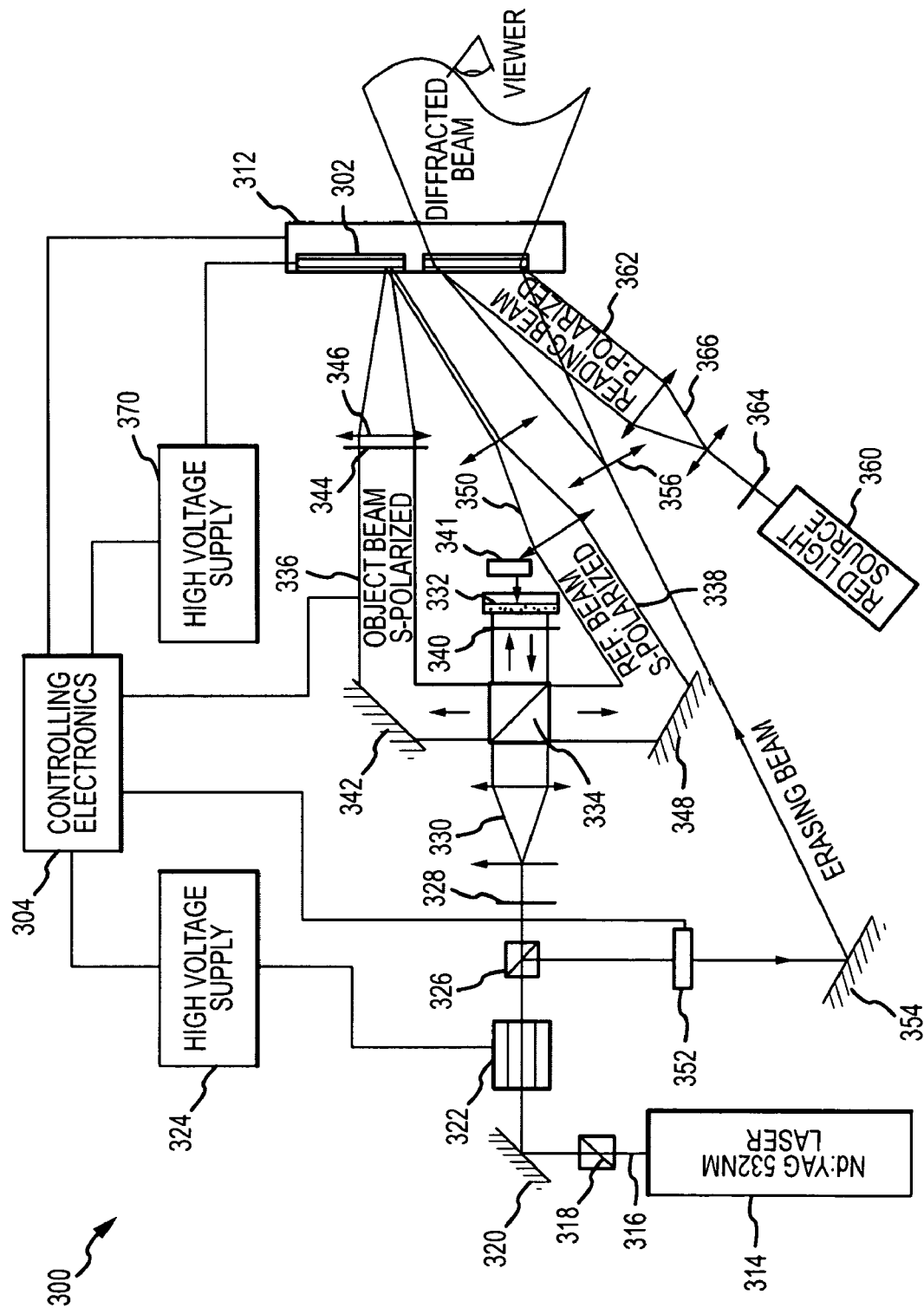
FIG. 13 is a diagram of an updateable 3D computer generated holographic display using the voltage-kick off.

The embodiment of the 3D holographic display depicted in FIG. 13 uses a transmission hologram geometry in which the two writing beams address the recording device from the same side. The reading beam goes through the device to read the hologram. In an alternate embodiment, a reflective hologram geometry can be used in which the writing beams address the device from opposite sides. In this case, the reading beam is diffracted back to the same side of the sample as the light source. The reflection geometry has the advantages that a polychromatic light source such as ambient light can be used for reading and the field of view can be larger since there is no need to reserve some of the solid angle for the writing beam which comes from the opposite side. The drawbacks are that reading and writing must be done with the same color.

For simplicity the embodiment of the 3D hologram was presented for a single color display. Multi-color reflection holograms are made by superimposing or interlacing different holograms written at different colors (red, green, and blue, for example). This requires different laser lines/sources. The overall hologram is read by using a white light source. Each individual hologram is wavelength selective and only diffracts one color (the one it was written with). The viewer sees the superimposition i.e. white or any other color depending upon the relative powers of the reading beams and the eye's spectral response. Multi-color transmission holograms are made by writing different holograms (one per color, superimposed or interlacing) at different angles (angle multiplexing). There is no need to change the writing source. By taking advantage of the angular selectivity during reading, one can use different reading monochrome sources placed at different angles. Each source (red, green, blue) replays one different hologram and the viewer see the superposition (white or other colors).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method for recording a hologram in a photorefractive polymer, said polymer having an optimal electrical field at which the diffraction efficiency is maximum, comprising:
    while applying a high electric field above the optimal field across the photorefractive polymer, writing with an object beam that interferes with a reference beam at the photorefractive polymer to record a hologram;
    removing both the object beam and reference beam prior to reaching a steady-state diffraction efficiency; and
    reducing the high electric field to a low electric field.

2. The method of claim 1, wherein a continuous wave (CW) laser generates the object and reference beams to write the hologram for a time that is less than 25% of the writing time to reach steady-state diffraction efficiency at the optimal electrical field.

3. The method of claim 1, wherein a continuous wave (CW) laser generates the object and reference beams, the application of said high electric field producing a dynamic diffraction efficiency having a local peak and a local minimum before increasing to the steady-state efficiency if written to steady-state, said writing time of the object and reference beams extending past said local peak.

4. The method of claim 1, wherein a pulsed laser generates the object and reference beams with a pulse width of no greater than approximately 150 ns.

5. The method of claim 1, wherein the pulsed laser writes the hologram in a single pulse.

6. The method of claim 1, wherein the high electric field is reduced to the low field at substantially the same time but no sooner than the object and reference beams are removed.

7. The method of claim 1, wherein once the object and reference beams are removed the continued application of the high electric field produces a dynamic diffraction efficiency that would have a local peak prior to dark decay, said high electric field being reduced to the low electric field prior to reaching the local peak.

8. The method of claim 1, wherein the photorefractive polymer lies between a ground electrode and a segmented high-voltage electrode to which DC voltages are applied to create an electric field for each segment, said photorefractive polymer divided into a plurality of pixels for each said high-voltage electrode segment, said object and reference beams recording a hologram onto each holographic pixel and then being removed to write the next holographic pixel for each electrode segment, said high electric field being reduced to the low electric field after the hologram for the last holographic pixel under the high-voltage electrode segment has been written.

9. The method of claim 1, wherein said photorefractive polymer has a characteristic diffraction efficiency according to the applied electric field including a first maximum at the optimal field, a breakdown field and a second minimum at a high field between the optimal and breakdown fields, said high electric field positioned between the mean of the optimum and high field at the second minimum and the breakdown field.

10. The method of claim 1, wherein the low electric field is positioned within plus or minus 10% of the optimal electric field.

11. The method of claim 1, wherein the low electric field is positioned within plus or minus 2% of the optimal electric field.

12. The method of claim 1, wherein the hologram is recorded with a figure of merit (FOM) that exceeds 1,000 where the FOM is defined as the ratio of the persistence to the write time with the persistence defined as the time period measured from the removal of the object and reference beams to the point the diffraction efficiency drops to 10%.

13. An apparatus for recording a hologram, comprising:
  a recording medium comprised of a photorefractive polymer between a ground electrode and a high-voltage electrode;
  a voltage source for applying a DC voltage between said high-voltage and ground electrodes to establish an electrical field across the polymer, said polymer having an optimal electrical field at which the diffraction efficiency is maximum and a higher electric field at which the diffraction efficiency has a local minimum;
  a coherent light source that supplies an object beam that interferes with a reference beam at the photorefractive polymer to record a hologram, said beams being removed prior to the recorded hologram reaching a steady-state diffraction efficiency;
  a controller that controls the voltage source to apply a high electric field above the optimal field across the photorefractive polymer when the object and reference beams are writing the hologram and to apply a low electric field once the object and reference beams are removed.

14. The apparatus of claim 13, wherein the coherent light source comprises a continuous wave (CW) laser, further comprising a shutter that is closed to remove the object and reference beams so that the writing time is less than 25% of the writing time to reach steady-state diffraction efficiency at the optimal electrical field.

15. The apparatus of claim 13, wherein the source comprises a pulsed laser that generates the object and reference beams with a pulse width of no greater than approximately 150 ns.

16. The apparatus of claim 13, wherein said controller sets the high electric field above the mean of the optimal and higher electric fields and reduces the electric field to the low electric field equal to the optimal electric field plus or minus 10% when the object and reference beams are removed.

17. The apparatus of claim 13, wherein the hologram is recorded with a figure of merit (FOM) that exceeds 1,000 where the FOM is defined as the ratio of the persistence to the write time with the persistence defined as the time period measured from the removal of the object and reference beams to the point the diffraction efficiency drops to 10%.

18. The apparatus of claim 13, wherein the high-voltage electrode comprises a plurality of segments with one or more hogels defined for each segment, said voltage source applying a different DC voltage to each segment to establish respective fields across the one or more hogels, further comprising:
  a memory that stores computer generated images for multiple perspectives of a 3D object to be displayed for each said hogel;
  a spatial light modulator that modulates the object beam with the computer generated images for a specific hogel to record a hologram; and
  a translation stage that translates the recording medium so that the reference and object beams sequentially address the one or more hogels for each said segment to record the respective holograms,
  said controller controlling the voltage source to reduce the DC voltage to apply the low electric field once the last hogel in the segment has been recorded and the object and reference beams removed for each said segment.

19. A method for recording computer generated holograms in a recording device for refreshable holographic 3D display, said recording device including a photorefractive polymer situated between a ground electrode and a segmented high voltage electrode with one or more hogels defined for each segment of the segmented electrode, said photorefractive polymer having an optimal electrical field at which the diffraction efficiency is maximum, comprising:
  a) providing computer generated images for multiple perspectives of a 3D object to be displayed for each said hogel;
  b) interfering a reference beam and an object beam at a position on the recording device;
  c) applying a voltage to a segment of the segmented high voltage electrode to establish a high electric field above the optimal field across the one or more hogels in the photorefractive polymer;
  d) translating the recording device so that the reference and object beams are positioned at a first hogel for said segment;
  e) modulating the object beam with the computer generated images for said first hogel to record a hologram;
  f) repeating steps d and e until the last hogel for the segment is recorded;
  g) after removing the object and reference beams from the last hogel reducing the voltage applied to the segment to switch the high electric field to a low electric field; and
  h) repeating steps c through g for the next segment of the segmented high voltage electrode until holograms are recorded for all of the hogels for each said segment.

20. The method of claim 19, wherein a continuous wave (CW) laser generates the object and reference beams to write the hologram for each said hogel for a time that is less than 25% of the writing time to reach steady-state diffraction efficiency at the optimal electrical field.

21. The method of claim 19, wherein a pulsed laser generates the object and reference beams with a pulse width of no greater than approximately 150 ns.

22. The method of claim 19, wherein the pulsed laser writes the hologram for each said hogel in a single pulse.

23. The method of claim 19, wherein said high electric field is set above the mean of the optimal and high electric fields and the low electric field is set equal to the optimal electric field plus or minus 10% when the object and reference beams are removed.

24. The method of claim 19, wherein the holograms are recorded with a figure of merit (FOM) that exceeds 1,000 where the FOM is defined as the ratio of the persistence to the write time with the persistence defined as the time period measured from the removal of the object and reference beams to the point the diffraction efficiency drops to 10%.

25. The method of claim 19, wherein there is one hogel per electrode segment.

26. An apparatus for recording computer generated holograms in a recording device for refreshable holographic 3D display, comprising:
   a recording device comprised of a photorefractive polymer between a ground electrode and a segmented high-voltage electrode with one or more hogels defined for each segment;
   a memory that stores computer generated images for multiple perspectives of a 3D object to be displayed for each said hogel;
   a voltage source for applying a DC voltages between said segmented high-voltage and ground electrodes to independently establish an electrical field across the photorefractive polymer in each electrode segment, said polymer having an optimal electrical field at which the diffraction efficiency is maximum;
   a coherent light source that supplies an object beam that interferes with a reference beam at a position on the photorefractive polymer;
   a spatial light modulator that modulates the object beam with the computer generated images for a specific hogel;
   a multi-axis translation stage that moves the recording device so that the modulated object and reference beams are positioned to record a hologram for said specific hogel;
   a first controller that controls the voltage source to apply a high electric field above the optimal field across the photorefractive polymer when object and reference beams are writing the hologram and to apply low electric field once the object and reference beams are removed from the last hogel in each said segment; and
   a second controller that controls the translation stage that translates the recording device from hogel to hogel with said beams being removed prior to said hogel reaching a steady-state diffraction efficiency until holograms are recorded for each hogel to record a 3D hologram of said 3D object for display.

27. The apparatus of claim 26, wherein the coherent light source comprises a pulsed laser that generates the object and reference beams with a pulse width of no greater than approximately 150 ns.

* * * * *